United States Patent [19]
Depinet et al.

[11] Patent Number: 5,343,998
[45] Date of Patent: Sep. 6, 1994

[54] METHOD AND APPARATUS FOR TURNING A BLOCK OF SIGNATURES

[75] Inventors: Paul E. Depinet, Tiffin; Don E. Detterman, Willard, both of Ohio

[73] Assignee: R. R. Donnelley & Sons Company, Chicago, Ill.

[21] Appl. No.: 115,178

[22] Filed: Aug. 31, 1993

[51] Int. Cl.$^5$ ............................................. B65G 47/24
[52] U.S. Cl. .................................................. 198/415
[58] Field of Search ......................................... 198/415

[56] References Cited

U.S. PATENT DOCUMENTS

| | | | |
|---|---|---|---|
| 2,356,120 | 8/1944 | Slightam | 198/416 |
| 2,534,221 | 12/1950 | Borkmann . | |
| 3,432,023 | 3/1969 | Lucas | 198/415 |
| 3,701,176 | 10/1972 | Procter et al. . | |
| 4,020,941 | 5/1977 | Kennedy | 198/402 |
| 4,085,839 | 4/1978 | Crawford | 198/410 |
| 4,155,133 | 5/1979 | Timson | 198/374 X |
| 4,874,078 | 10/1989 | Meyer | 198/409 |
| 4,901,842 | 2/1990 | Lemboke et al. | 198/415 |
| 4,967,899 | 11/1990 | Newsome | 198/415 |
| 5,143,197 | 9/1992 | Sauer | 198/409 |

Primary Examiner—Cheryl L. Gastineau
Attorney, Agent, or Firm—Arnold, White & Durkee

[57] ABSTRACT

An oblong block turning apparatus comprises a conveyor pin assembly, a block advance pin assembly, a pivot pin assembly, a flip pin assembly, and an elongated trough with a pair of side walls bridged by a bottom surface. The pin assemblies include respective chains carrying a plurality of respective pins which extend laterally through the trough while moving downstream through the trough. To turn an oblong block deposited into the trough, the block is first pushed downstream through the trough using a conveyor pin of the conveyor pin assembly. Next, the block is disengaged from the conveyor pin by advancing the block downstream away from the conveyor pin with a faster-moving block advance pin. While maintaining the lower leading corner of the block against a pivot pin of the pivot pin assembly, the block is turned ninety degrees forward about the pivot pin using a flip pin of the flip pin assembly. After turning the block, the conveyor pin re-engages the block to push the block downstream through the trough.

23 Claims, 6 Drawing Sheets

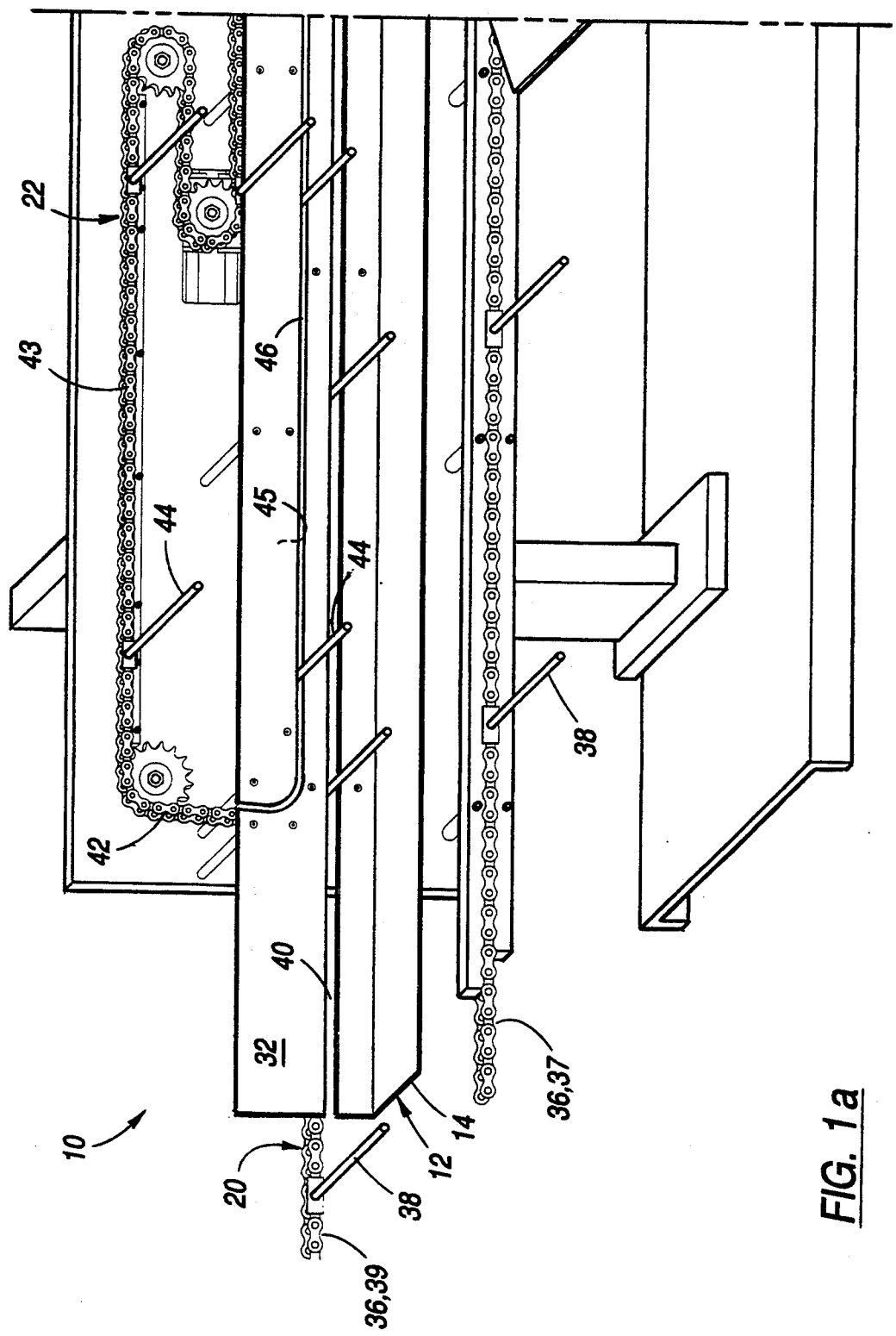

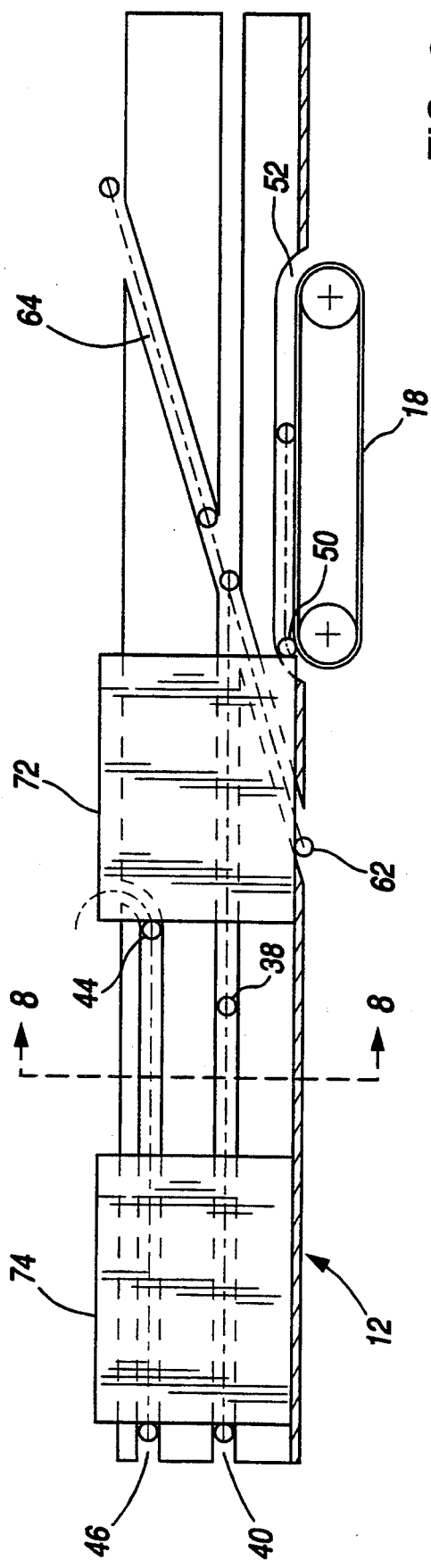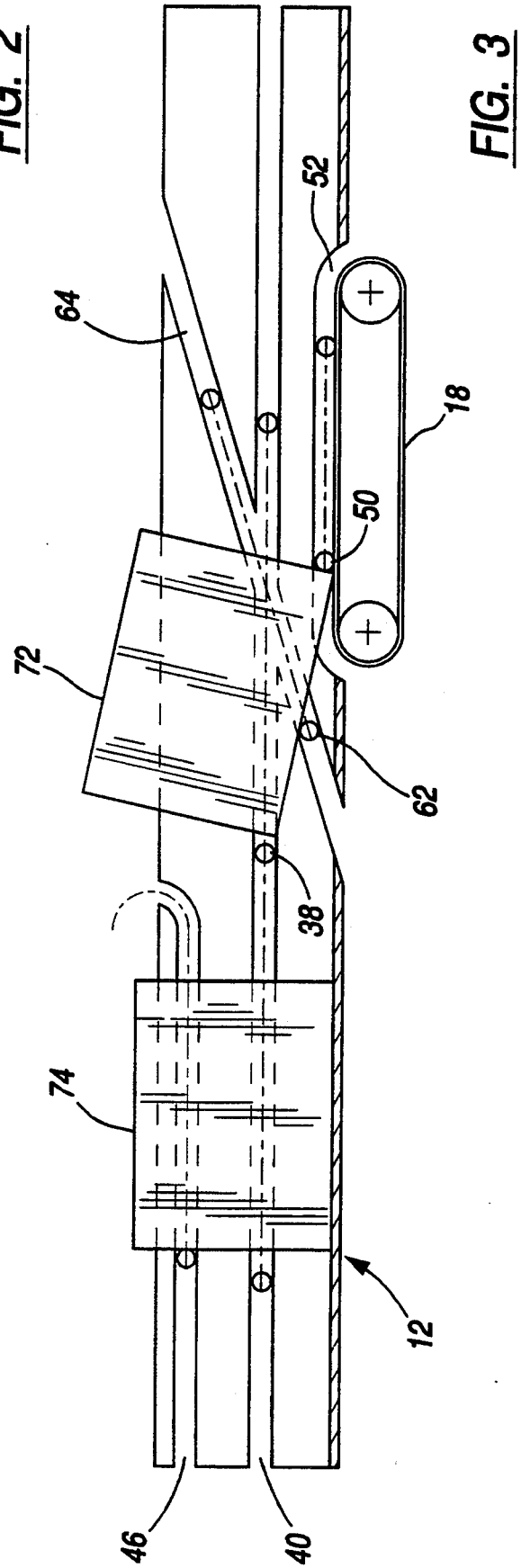

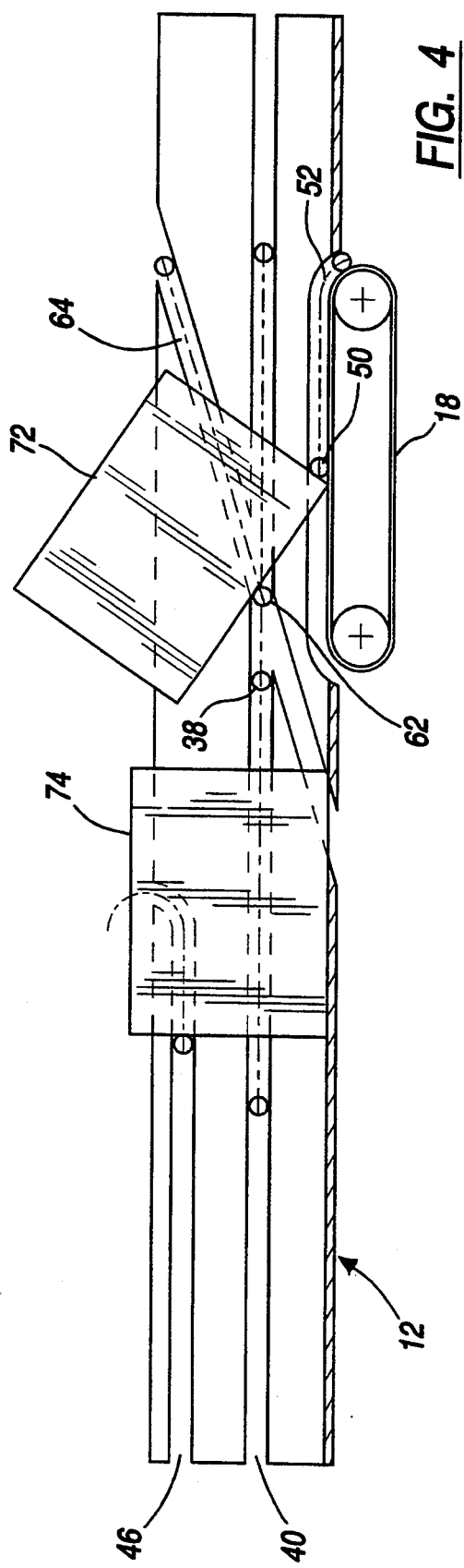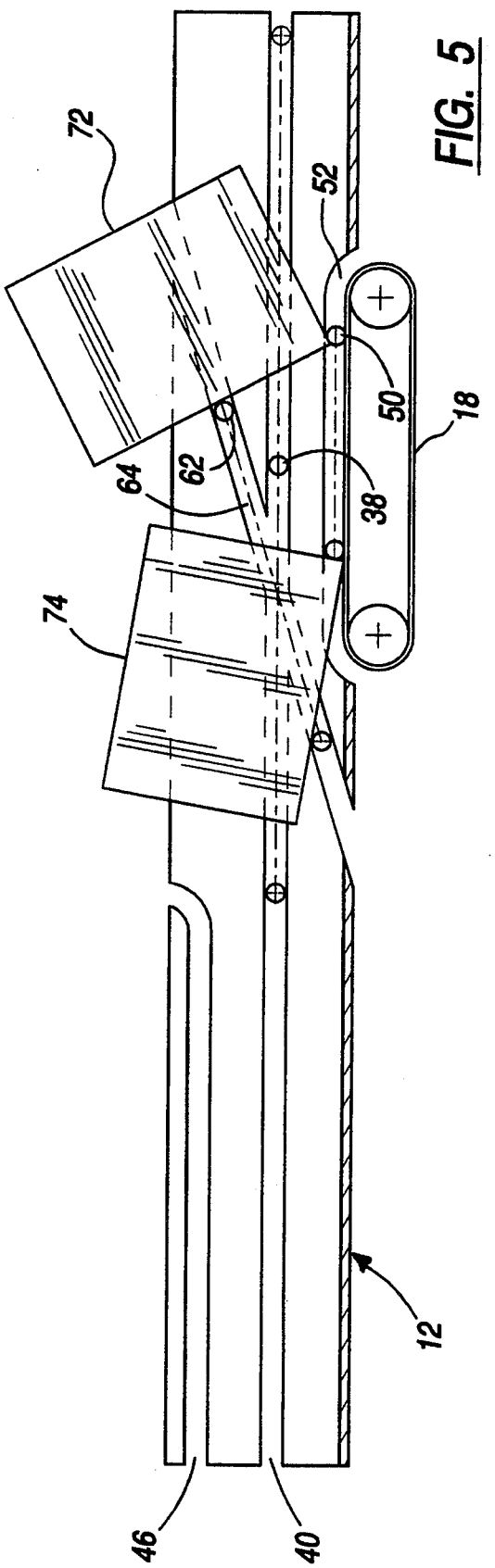

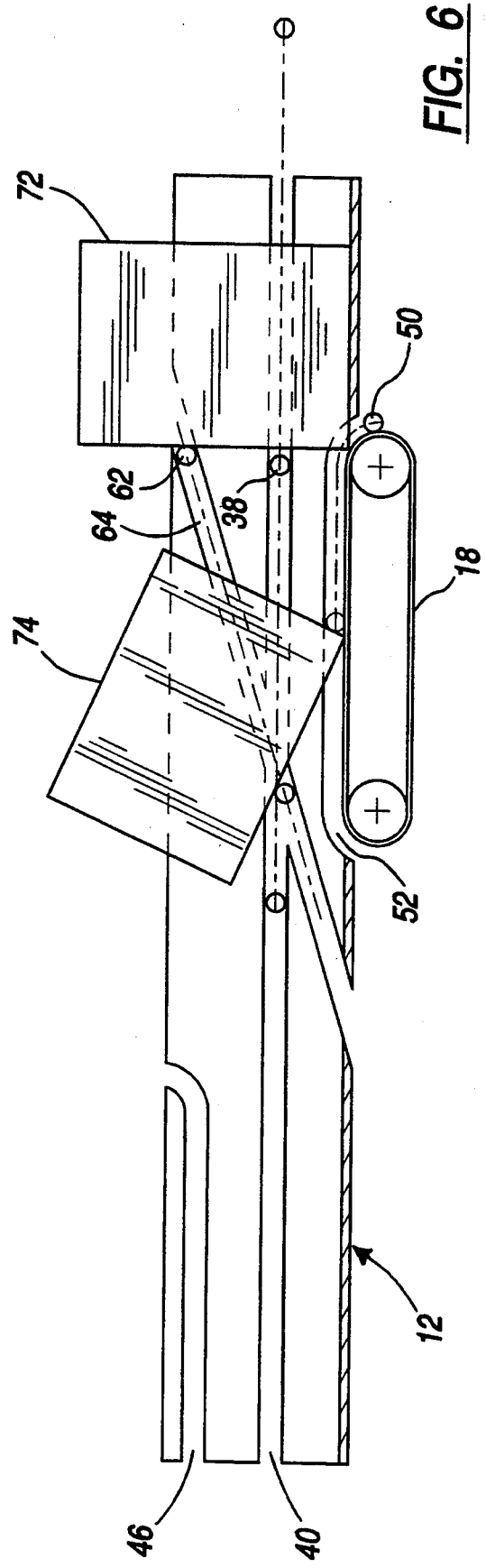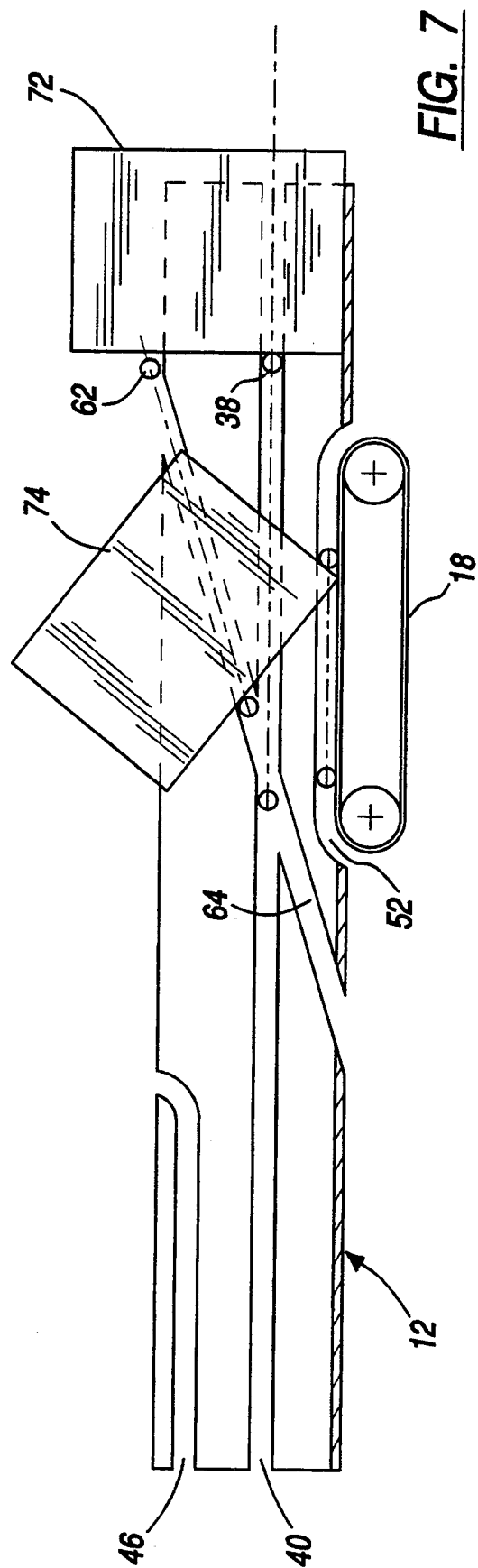

METHOD AND APPARATUS FOR TURNING A BLOCK OF SIGNATURES

FIELD OF THE INVENTION

The present invention relates generally to devices for turning blocks of signatures and, more particularly, relates to a method and apparatus for turning blocks having oblong configurations.

BACKGROUND OF THE INVENTION

Books or pamphlets are generally rectangular in shape and include a long side and a short side. In the bookbinding industry, a signature is a folded, printed sheet, typically consisting of 16 or 32 pages, that forms a section of a book or a pamphlet. To construct a book, a block of signatures are first gathered together by a gathering machine. Next, the block is deposited into an elongated travel trough with the long side of the block abutting the bottom surface of the trough. The travel trough has a pair of parallel side walls adjustable to the width of the block to maintain the integrity of the block. The block is transported through the trough using a conveyor chain located adjacent the trough and carrying a plurality of pins extending laterally into the trough. Each of the conveyor pins engages a respective block deposited into the trough. To transport a deposited block to a binding machine, a downstream-moving pin engages the trailing short side of the block and pushes the block through the trough to the binding machine. Since the bound side of most books is the long side, the foregoing arrangement is usually sufficient. However, some books such as many children's books and cookbooks are often configured with the bound side being the short side so that the printed lines are parallel, rather than perpendicular, to the long side. Such books are often referred to as "oblong" books.

The gathering machine places all blocks of signatures into the travel trough with the long side abutting the bottom surface of the trough, whether or not the blocks are oblong in configuration. Therefore, in order for an oblong block to be correctly bound on the short side thereof, the oblong block must be turned ninety degrees prior to reaching the binding machine. One technique for turning oblong blocks employs a drop point along the trough. When an oblong block reaches the drop point, the block falls forward into a lower trough section with the block rotating ninety degrees in the process of falling. The block rotates because gravity causes the leading side of the block to fall prior to the trailing side.

A drawback of this technique is that control of the blocks is not maintained in the turning process. Instead, the blocks undergo an uncontrolled, jerky turning motion while they fall at the drop point. Another drawback is that the blocks are often damaged due to the lack of control in the turning process. More specifically, the falling and turning blocks temporarily space themselves ahead of the respective pins pushing the blocks through the trough. After the blocks land on the conveyor belt beyond the drop point, the pins "catch up" and strike the respective blocks, often damaging them in the process. Furthermore, the uncontrolled turning motion sometimes causes individual signatures in the blocks to shift relative to the other signatures in the block, thereby smearing the print on the misaligned signatures and the signatures adjacent the misaligned signatures and requiring downstream realignment of the misaligned signatures. Yet another drawback of the "drop" technique is that book turning is not consistent at different conveyor chain speeds or at different block sizes. To switch from one block size to another often requires reconfiguration of the drop point. A further drawback is that this technique often requires the supervision of an attendant to insure smooth operation and correct the above-identified problems.

Therefore, a need exists to overcome the foregoing drawbacks associated with existing techniques for turning oblong blocks of signatures.

SUMMARY OF THE INVENTION

In accordance with the foregoing, the present invention provides A method for turning a rectangular block having a pair of first sides and a pair of second sides substantially orthogonal to the pair of first sides, comprising the steps of pushing the block downstream through a trough using a conveyor pin, the bottom surface of the trough supporting one of the first sides of the block prior to turning the block; disengaging the block from the conveyor pin by advancing the block downstream away from the conveyor pin with a block advance pin; maintaining a lower portion of the leading second side of the block against a pivot pin; pivoting the block approximately ninety degrees forward about the pivot pin using a flip pin while the lower portion of the leading second side is maintained against the pivot pin; and after pivoting the block approximately ninety degrees, pushing the block downstream through the trough using the conveyor pin, the bottom surface of the trough supporting one of the second sides of the block.

BRIEF DESCRIPTION OF THE DRAWINGS

FIG. 1A is a perspective view of one half of the block turning apparatus embodying the present invention;

FIGS. 2 through 7 are a block flow diagram showing the steps for turning a block in accordance with the present invention.

DETAILED DESCRIPTION OF THE PREFERRED EMBODIMENT

Figure 1B:
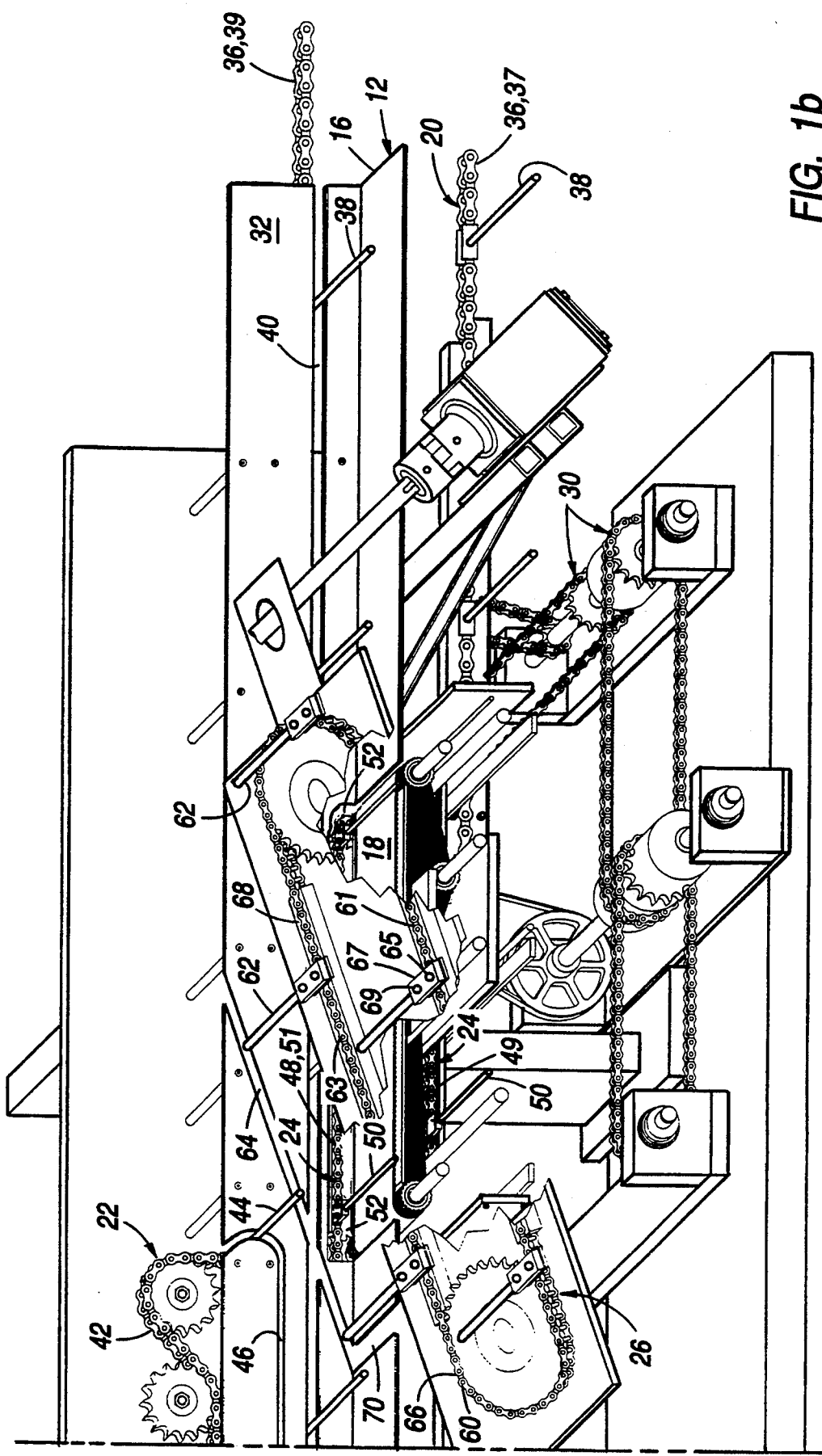
FIG. 1B is a perspective view of the other half of the block turning apparatus embodying the present invention.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents, and alternatives falling within the spirit and scope of the invention as defined by the appended claims.

Figure 8:
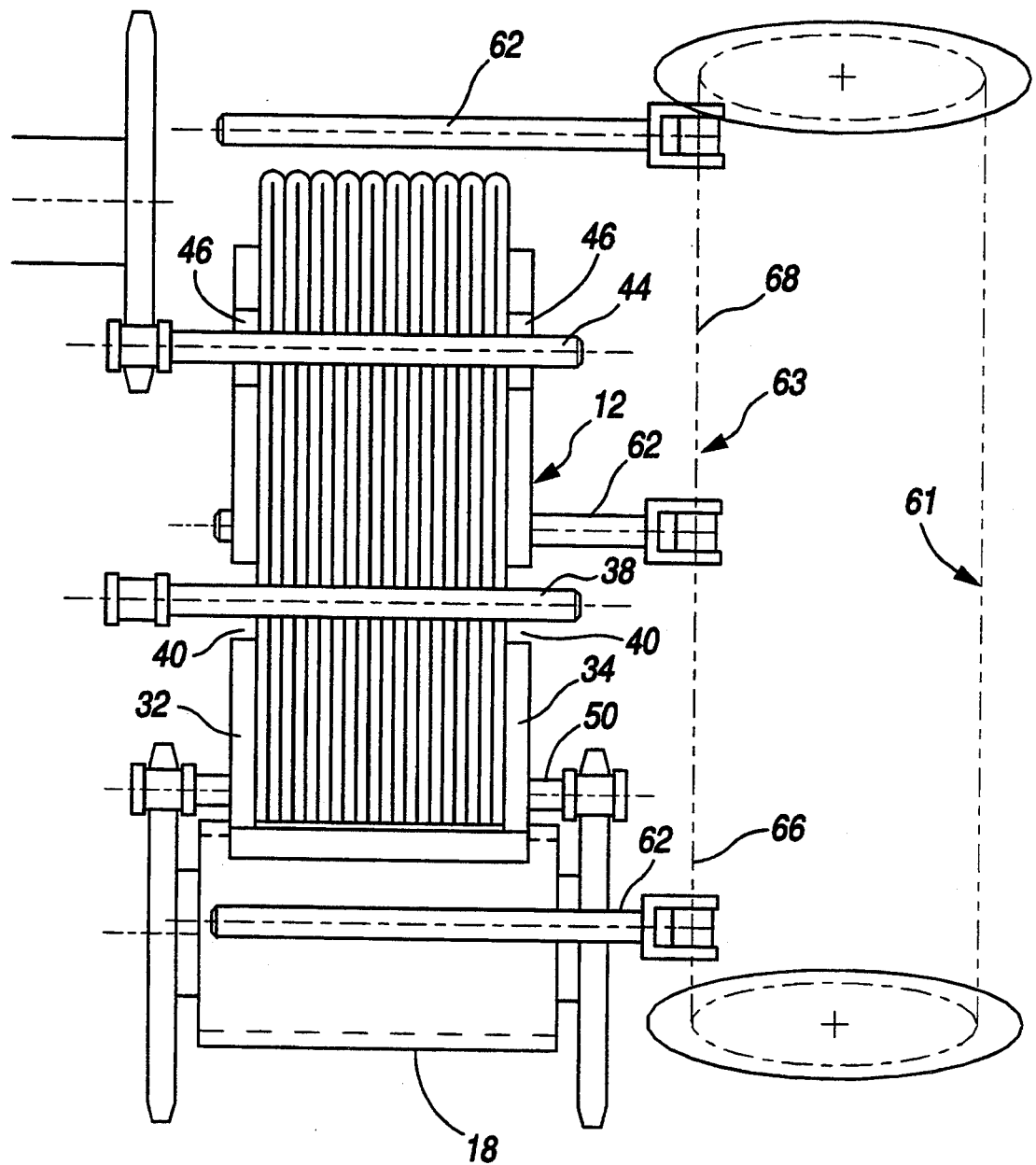
FIG. 8 is a section taken generally along the line 8—8 in FIG. 2.

Turning now to the drawings, FIGS. 1A–B illustrate an oblong block turning apparatus 10 including an elongated metal trough or channel 12 extending between an upstream end 14 and a downstream end 16, a conveyor belt 18, four pin assemblies 20, 22, 24, and 26, and a conventional driving assembly having a motor (not shown) and a plurality of drive chains 30. A signature gathering station deposits a vertical block of loose gathered signatures at the upstream end 14 of the elongated trough 12 for transport to the downstream end 16 of the elongated trough 12. The elongated trough includes a pair of parallel vertical side walls 32, 34, and the distance between the side walls 32, 34 is adjustable to accommodate different block widths (FIG. 8).

The pin assembly 20 is a conventional conveyor pin assembly including a roller chain 36 driven by one of the drive chains 30 and carrying a plurality of conveyor elongated pins 38. The roller chain 36 includes a section 37 moving upstream at a given moment in time and a section 39 moving downstream at the same moment in time. The chain is positioned adjacent the side wall 32 of the trough 12 with the plane of the chain 36 parallel to the side wall 32. The conveyor pins 38 are spaced equidistant from one another along the chain 36 and extend perpendicularly from the plane of the chain 36. The pins 38 on the downstream-moving section 39 of the chain 36 extend laterally through the side wall 32, into the trough 12, and through the other side wall 34 (FIG. 8) via an elongated slot 40 in the side walls 32, 34. It is preferred that the elongated slot 40 be formed in both of the side walls 32, 34 to permit the pins 38 to extend laterally across the entire width of the trough 12. Since the pins 38 cover the entire width of the trough 12, the signatures in a vertical block cannot avoid engagement with a pin 38 by slipping outside the lateral reach of the pin 38. The slot 40 extends between the upstream and downstream ends 14, 16 of the elongated trough 12 to permit movement of the pins 38 through the length of the trough 12. While extending through the slot 40 into the elongated trough 12, the conveyor pins 38 move downstream through the trough 12 parallel to the bottom surface of the trough 12.

Each conveyor pin 38 transports a respective vertical block of signatures from the signature gathering station to a binding station by pushing the respective block through the travel trough 12. In particular, the gathering station deposits an oblong block into the upstream end 14 of the elongated trough 12 with a long side of the block abutting the bottom surface of the trough 12. After the block is deposited in the trough 12, a conveyor pin 26 engages the trailing short side of the block to initiate transport through the trough 12. Since signature blocks are continuously deposited in the trough 12, the conveyor pins 26 are spaced sufficient distances from one another to accommodate relatively large blocks between the pins 26 for transport and turning. In the preferred embodiment, the pins 26 are spaced twenty inches from another and the chain 36 is driven at a speed which will hereafter be referred to as the "reference speed". The reference speed permits a certain number of blocks to be processed through the block turning apparatus 10 per minute. In the preferred embodiment, the reference speed is selected to process one hundred blocks per minute.

The pin assembly 22 includes a roller chain 42 driven by one of the drive chains 30 and carrying a plurality of elongated pins 44. A pin 44 advances a block in the trough 12 away from its respective conveyor pin 38 just prior to turning the block (FIG. 2). In other words, the pin 44 disengages the trailing short side of the block from its respective conveyor pin 38 by pushing the block ahead (downstream) of the conveyor pin 38. Advancing the block away from its respective conveyor pin 38 provides the block with a free path to rotate about the lower leading corner of the block without the trailing short side contacting the conveyor pin 38.

The roller chain 42 includes an upstream-moving section 43 and a downstream-moving section 45. As in the pin assembly 20, the chain 42 of this "block advance" assembly 22 is positioned outside the trough 12 adjacent the side wall 32 of the trough 12 with the plane of the chain 42 parallel to the side wall 32. The block advance pins 44 are spaced equidistant from one another along the chain 42 and extend perpendicularly from the plane of the chain 42. The block advance pins 44 on the downstream-moving section 45 of the chain 42 extend laterally through the side wall 32, into the trough 12, and through the side wall 34 (FIG. 8) via another elongated slot 46 in the side walls 32, 34. The slot 46 is preferably positioned above the slot 40 and is configured to follow the motion path of the block advance pins 44 attached to the chain 42. Therefore, the slot 46 passes through the upper edges of the respective side walls 32, 34 at an upstream location where the block advance pins 44 enter the trough 12 for downstream movement through the trough 12 and at a more downstream location where the block advance pins 44 exit the trough 12 to return upstream.

While extending through the slot 46 into the elongated trough 12, the block advance pins 44 move downstream through the trough 12 parallel to the bottom surface of the trough 12. As indicated by the higher position of the slot 46 relative to the slot 40, the block advance pins 44 are spaced farther from the bottom surface of the trough 12 than the conveyor pins 38. That is, the downstream-moving section 45 of the chain 42 is positioned higher above the bottom surface of the trough 12 than the downstream-moving section 39 of the chain 36. As a result, the block advance pins 44 engage with a higher portion of the trailing short sides of the blocks than the conveyor pins 38. In order to disengage the trailing short side of a particular block from its respective conveyor pin 38, the chain 42 carrying the block advance pins 44 is driven at a faster rate than the chain 36 carrying the conveyor pins 38. To counteract this faster rate, the spacing between the block advance pins 44 is greater than the spacing between the conveyor pins 38.

Moreover, to associate a single block advance pin 44 with each conveyor pin 38 moving a block through the trough 12, the spacing between the block advance pins 44 relative to the spacing between the conveyor pins 38 is equal to the ratio of the rate of the chain 42 to the rate of the chain 36. This relationship for achieving a one-to-one correspondence between block advance pins 44 and conveyor pins 38 derives from the standard equation that distance equals rate multiplied by time. If the block advance chain 42 has a faster rate than the conveyor chain 36, then the block advance pins 44 on the chain 42 will only arrive at a specific location in the trough 12 at the same time as the conveyor pins 38 on the chain 36 if the ratio of pin spacing on the block advance chain 42 is the same as the ratio of pin spacing on the conveyor chain 36. In the preferred embodiment, the block advance chain 42 contains six equally-spaced block advance pins 44 which move 1.2 times (120 percent) faster than the "reference speed" of the conveyor chain 36. Therefore, the spacing between the block advance pins 44 is 1.2 multiplied by the twenty-inch spacing between the conveyor pins 38, or twenty-four inches.

Following disengagement of a block from its respective conveyor pin 38 by a block advance pin 44, the block advance pin 44 releases its contact with the block and exits the trough 12 via the slot 46. It is at this point that the block is prepared for rotation about its lower leading corner in the manner described below.

The pin assembly 24 includes a pair of roller chains 48 (only one is shown in FIG. 1B) driven at the same speed by one of the drive chains 30 and carrying a plurality of pins 50. After a block advance pin 44 disengages a block from its respective conveyor pin 38, a pin 50 engages the leading lower corner of the block to permit the block to pivot or rotate about its leading lower corner (FIG. 2). The chains 48 include respective upstream-moving sections 49 and respective downstream-moving sections 51. The chains 48 of this "pivot" assembly 24 are positioned outside the trough 12 with one of the chains 48 adjacent the side wall 32 (shown in FIG. 1B) and the other of the chains 48 adjacent the side wall 34 (not shown in FIG. 1B). The planes of the chains 48 are parallel to one another and to the side walls 32, 34. The downstream-moving sections 51 of the respective chains 48 are positioned slightly above the plane of the bottom surface of the trough 12, while the upstream sections 49 are positioned below the plane of the bottom surface of the trough 12. Moreover, the chains 48 are aligned opposite one another such that imaginary perpendicular lines extending from one of the chains 48 intersect the other of the chains 48. Due to this alignment, each of the pivot pins 50 connected between the chains 48 are oriented perpendicular to the planes of the chains 48.

The pivot pins 50 are spaced equidistant from one another along the chains 48, and the pivot pins 50 on the downstream-moving section 51 of the chains 48 extend laterally through the trough 12 adjacent the bottom surface of the trough 12 (FIG. 8). As discussed below, the bottom surface of the trough 12 is generally stationary throughout the trough 12, except at the location of the pivot pin assembly 24, where the stationary bottom surface is removed and replaced with a moving bottom surface formed from the conveyor belt 18. The lower sections of the respective side walls 32, 34 of the trough 12 are cut away at the location of the pivot pin assembly 24 to permit movement of the pivot pins 50 through the trough 12. The pivot pins 50 on the downstream-moving section 51 of the chain 48 extend laterally through the trough 12. The cut-away sections 52 of the side walls 32, 34 are configured to follow the motion path of the pivot pins 50 attached to the chain 48. Therefore, the cut-away sections 52 begin at the lower edges of the respective side walls 32, 34 at an upstream location where the pivot pins 50 enter the trough 12 for downstream movement through the trough and end at a more downstream location where the pivot pins 50 exit the trough 12 to return upstream.

As indicated by the cut-away sections 52, the pivot pins 50 move parallel to the bottom surface of the trough 12 in close proximity to that bottom surface. The pivot pins 50 provide pivot points about which to rotate blocks moving through the trough 12. A block disengaged from its respective conveyor pin 38 by a block advance pin 44 encounters a pivot pin 50 entering the trough 12 via the cut-away sections 52. The block advance pin 44 releases its engagement with the trailing short side of the block at the same time (or slightly before) that the lower leading corner of the block "strikes" the pivot pin 50 (FIG. 2). To maintain the block against the downstream-moving pivot pin 50 following disengagement from the block advance pin 44, the bottom surface of the trough 12 is provided with the conveyor belt 18. Within the trough 12, the conveyor belt 18 runs immediately beneath the pivot pins 50, moving downstream at least as fast as the pivot pins 50. In addition, the conveyor belt 18 is laterally positioned between the chains 48 (FIG. 8). The conveyor belt 18 is wider than the trough 12 to insure engagement with all the signatures of a block (FIG. 8), and, as previously stated, the stationary bottom surface of the trough 12 is removed and replaced with the conveyor belt 18 at the location of the pivot pin assembly 24.

The pivot chain 48 preferably includes six equally-spaced pivot pins 50 which move at a slower rate than the conveyor chain 36 and, more specifically, moves at half (50 percent) the "reference speed" of the conveyor chain 36. Therefore, to associate a single pivot pin 50 with each block-carrying conveyor pin 38, the spacing between the pivot pins 50 is equal to half the spacing between the conveyor pins, i.e., ten inches. Although the conveyor belt 18 need only move as fast as the pivot chain 48 to maintain a block against a pivot pin 50, the conveyor belt 18 is preferably driven at the same speed as the "reference speed" so as to firmly engage the block against the pivot pin 50 during subsequent rotation.

The block turning apparatus 10 employs the pivot pins 50 with downstream motion, instead of a stationary pivot pin, in order to provide for a more controlled rotation of blocks about the pivot pins 50. A block disengaged from its respective conveyor pin 38 by a block advance pin 44 is maintained against a pivot pin 50 by the conveyor belt 18 and then rotated about the pivot pin 50. As this is occurring, the conveyor pin 38 is "catching up" to the slower moving pivot pin 50 (FIGS. 3–6). However, the downstream motion of the block and pivot pin 50 prevents the conveyor pin 38 from re-engaging (catching up to) the block until after the block is rotated ninety degrees (FIG. 7).

The pin assembly 26 includes a roller chain 60 driven by one of the drive chains 30 and carrying a plurality of elongated pins 62. The pin 62 engages the long bottom side of block and rotatably lifts that long bottom side while the lower leading corner of the block is maintained against a pivot pin 50 (FIGS. 3–6). This "flip" pin 62 moves linearly downstream, at an upward angle relative to the direction of downstream block flow, while contacting the long side of the block. The block does not slide, but rather rotates, because of its engagement with the pivot pin 50. After the block is rotated ninety degrees, the "flip" pin 62 releases its contact with the long side of the block (FIG. 7). At this time, the respective conveyor pin 38 of the block "catches up" to the slower-moving pivot pin 50 to carry the block further downstream to the binding station.

The roller chain 60 of this "flip" assembly 26 includes an upstream-moving section 61 and a downstream-moving section 63, and the chain 60 is positioned outside the trough 12 adjacent the side wall 34 of the trough 12. Instead of being oriented parallel to the side wall 34, however, the plane of the chain 60 is substantially orthogonal to the side wall 34. Moreover, the chain 60 as a whole makes an acute angle with the plane of the bottom surface of the trough 12, where the chain 60 as a whole angles upwardly relative to that bottom surface as one moves in the downstream direction.

The flip pins 62 are spaced equidistant from one another along the chain 60 and extend outwardly in the same direction from the chain 60. While the pins in the other three pin assemblies 20, 22, and 24 are perpendicular to the planes of the respective chains, the flip pins 62 are positioned parallel to the plane of the chain 60 so that they extend outwardly in the same direction from the chain 60. Since the plane of the chain 60 is perpendicular to the side walls 32, 34, the flip pins 62 are also perpendicular to the side walls 32, 34. To maintain the flip pins 62 pointed in the same direction toward the trough 12 at all times, i.e., on both the upstream-moving and downstream-moving sections 61, 63, the flip pins 62 are rotatably mounted to the chain 60 and another identically-shaped chain (not shown) is positioned directly above the chain 60 but laterally offset from the chain 60 in the direction of the trough 12. For each flip pin 62, the chain 60 is connected to one end 65 of the flip pin attachment lug 67, while this additional chain is connected to the other end 69 of the lug 67. With the additional chain moving at the same speed and in the same direction as the chain 60, it can be seen from the foregoing arrangement that the additional chain is laterally offset from the chain 60 by the distance between the lug ends 65, 69 and that the additional chain keeps the flip pins 62 pointed in the same direction at all times.

The downstream-moving section 63 of the chain 60 includes a first portion 66 positioned below the plane of the bottom surface of the trough 12 and a second portion 68 positioned above the plane of the bottom surface of the trough 12. The flip pins 62 on the first portion 66 of the downstream-moving section 63 extend laterally beneath the bottom surface of the trough 12. The flip pins 62 on the second portion 68 extend laterally through the side wall 34, into the trough 12, and through the side wall 32 (FIG. 8) via an elongated angled slot 64 in the side walls 32, 34 of the trough 12. The angled slot 64 also includes a lateral portion 70 in the bottom surface of the trough 12, extending between the side walls 32, 34, which permits a flip pin 62 on the first portion 66 of the downstream-moving section 63 of the chain 60 to move into the trough 12 via the lateral portion 70. The lateral portion of the angled slot 64 is positioned just upstream relative to the upstream end of the conveyor belt 18 to permit a flip pin 62 to engage the long bottom side of a block at approximately the same time that a pivot pin 50 strikes the lower leading corner of the block. The angled slot 64 is configured to follow the upward angular motion path of the flip pins 44. The slot 64 passes through the upper edges of the side walls 32, 34 at the downstream location where the flip pins 44 exit the trough 12 to return upstream.

The flip pin chain 60 is driven at such at rate and the flip pins 62 are spaced at such a distance that a flip pin 62 is able to rotate a block disengaged from its conveyor pin 38 and maintained against a pivot pin 50 before the conveyor pin 38 re-engages the block. Moreover, the rate of the chain 60 and the spacing of the flip pins 62 are chosen to achieve a one-to-one correspondence between the flip pins 62 and the blocks passing through the trough 12. In the preferred embodiment, the chain 60 carries a total of five flip pins 62 driven at a rate which is 0.8125 (82.25 percent) times the "reference speed" of the conveyor pins 38. To associate a single flip pin 62 with each block moving through the trough 12, the flip pins 62 are therefore spaced apart from one another by a distance equal to 0.8125 multiplied by the twenty-inch spacing between the conveyor pins 38, or 16.25 inches.

The angle of the flip pin chain 60 and the corresponding movement angle of the flip pins 62 within the trough 12 relative to the bottom surface of the trough 12 is preferably low to permit for a relatively slow and controlled turning of the blocks. A low angle, however, increases the length of the block turning apparatus 10 by increasing the distances between the pins on the respective pin assemblies 20, 22, 24, and 26. In the preferred embodiment, the selected angle of the flip pin chain 60 (and corresponding movement angle of the flip pins 62) is slightly greater than nineteen degrees relative to the bottom surface of the trough 12 to permit relatively controlled block turning and, at the same time, minimize the length of the block turning apparatus 10.

The overall operation of the block turning apparatus 10 is described below with reference to the block flow diagram in FIGS. 2 through 7. First, a block 72 being pushed by a conveyor pin 38 is disengaged from its conveyor pin 38 by a faster-moving block advance pin 44 (FIG. 2). Second, the block advance pin 44 disengages the trailing short side of the block 72 and, at approximately the same time, a pivot pin 50 and a flip pin 62 engage the respective lower leading corner and the long bottom side of the block 72 (FIG. 2). Third, while the conveyor belt 18 maintains the lower leading corner of the block 72 against the pivot pin 50, the flip pin 62 lifts and rotates the block 72 forward about the pivot pin 50 (FIGS. 3–6). Due to the selected speeds of the assembly pins, the block 72 is sufficiently advanced ahead of the conveyor pin 38 so that the lower trailing corner of the block 72 "clears" the conveyor pin 38 during the forward rotation of the block 72 (FIG. 3). Fourth, the flip pin 62 continues to rotate the block 72 forward about the pivot pin 50 until the block 72 has been rotated ninety degrees (FIG. 6). Fifth, when the block 72 has been rotated ninety degrees, the flip pin 62 disengages from the block 72 and the conveyor pin 38 re-engages the block 72 at approximately the same time (FIG. 7). The conveyor pin 38 then carries the block 72 downstream to the binding station.

It can be seen from FIGS. 2–7 that the pin speeds are chosen such that a second block 74 undergoes one portion of the foregoing turning process at the same time that the block 72 undergoes another portion of the turning process. For example, while the block 72 is first engaged to the pivot pin 50 and the flip pin 62, the second block 74 is engaged by another block advance pin 44 and pushed ahead of its respective conveyor pin 38 (FIGS. 2 and 3). Furthermore, while the block 72 is rotated forward about the pivot pin 50, the lower leading corner of the block 74 is engaged by another pivot pin 50 and another flip pin 62 (FIG. 5). While the block 72 completes its rotation about its pivot pin 50, the block 74 is still being rotated about its pivot pin 50 (FIG. 6). Although not shown in FIGS. 2–7, yet another block similarly begins the turning process while the block 74 is in the middle of the turning process. Thus, the block turning apparatus 10 employs continuous, not cyclic, motion to turn blocks continuously deposited into the upstream end of the trough 12. The relative speeds of the pin assemblies allows for continuous block flow without hesitation or jerking of the blocks.

While the present invention has been described with reference to one or more particular embodiments, those skilled in the art will recognize that many changes may be made thereto without departing from the spirit and scope of the present invention. For example, since the number of pins in the assemblies 20, 22, 24, and 26 is simply dictated by the respective upstream return paths of the pins and the length of the respective chains required to traverse those paths, the number of pins in an assembly is modified by changing the pin return path for that assembly. Each of these embodiments and obvious variations thereof is contemplated as falling within the spirit and scope of the claimed invention, which is set forth in the following claims.

What is claimed is:

1. A method for turning a rectangular block having a pair of first sides and a pair of second sides substantially orthogonal to the pair of first sides, comprising the steps of:
   pushing the block downstream through a trough using a conveyor pin, the bottom surface of the trough supporting one of the first sides of the block prior to turning the block;
   disengaging the block from the conveyor pin by advancing the block downstream away from the conveyor pin with a block advance pin;
   maintaining a lower portion of the leading second side of the block against a pivot pin;
   pivoting the block approximately ninety degrees forward about the pivot pin using a flip pin while the lower portion of the leading second side is maintained against the pivot pin; and
   after pivoting the block approximately ninety degrees, pushing the block downstream through the trough using the conveyor pin, the bottom surface of the trough supporting one of the second sides of the block.

2. The method of claim 1, wherein said step of pushing the block downstream through a trough using a conveyor pin, the bottom surface of the trough supporting one of the first sides of the block prior to turning the block, includes extending the conveyor pin laterally across the width of the trough via a slot formed in the trough and moving the conveyor pin downstream through the trough substantially parallel to the bottom surface of the trough.

3. The method of claim 2, further including the step of providing a chain adjacent the trough for carrying the conveyor pin.

4. The method of claim 1, wherein said step of disengaging the block from the conveyor pin by advancing the block downstream away from the conveyor pin with a block advance pin, includes extending the block advance pin laterally across the width of the trough via a slot formed in the trough and moving the block advance pin downstream through the trough substantially parallel to the bottom surface of the trough.

5. The method of claim 4, further including the step of providing a chain adjacent the trough for carrying the block advance pin.

6. The method of claim 1, further including the step of extending the pivot pin laterally across the width of the trough via cut-away sections formed in the trough and moving the pivot pin downstream through the trough adjacent and substantially parallel to the bottom surface of the trough.

7. The method of claim 6, further including the step of providing a chain adjacent the trough for carrying the pivot pin.

8. The method of 1, wherein the step of maintaining a lower portion of the leading second side of the block against a pivot pin, includes providing a conveyor belt beneath the pivot pin.

9. The method of claim 1, wherein said step of pivoting the block approximately ninety degrees about the pivot pin using a flip pin while the lower portion of the leading second side is maintained against the pivot pin, includes extending the flip pin laterally across the width of the trough via an angled slot formed in the trough and moving the flip pin downstream through the trough beginning at the bottom surface of the trough and moving through an angle extending away from the bottom surface of the trough.

10. The method of claim 9, further including the step of providing a chain adjacent the trough for carrying the flip pin.

11. An apparatus for turning a rectangular block having a pair of first sides and a pair of second sides substantially orthogonal to the pair of first sides, comprising:
    an elongated trough extending between an upstream end and a downstream end, said elongated trough having a bottom surface supporting one of the first sides of the block prior to turning the block and supporting one of the second sides of the block after turning the block;
    means, including a conveyor pin, for pushing the block downstream through said trough prior to and after turning the block;
    means, including a block advance pin, for disengaging the block from said conveyor pin and advancing the block downstream away from said conveyor pin prior to turning the block;
    means, including a pivot pin, for engaging a lower portion of the leading second side of the block and maintaining the lower portion against said pivot pin following disengagement of the block from said conveyor pin; and
    means, including a flip pin, for pivoting the block approximately ninety degrees forward about said pivot pin while the lower portion of the leading second side of the block is maintained against said pivot pin.

12. The apparatus of claim 11, wherein said trough includes a pair of substantially parallel sides walls connected to said bottom surface of said trough for guiding the block through said trough.

13. The apparatus of claim 11, wherein said conveyor pin extends laterally across the width of said trough via a slot formed in said trough and moves downstream through said trough substantially parallel to said bottom surface of said trough.

14. The apparatus of claim 13, wherein said pushing means includes a chain positioned adjacent said trough and carrying said conveyor pin.

15. The apparatus of claim 11, wherein said block advance pin extends laterally across the width of said trough via a slot formed in said trough and moves downstream through said trough substantially parallel to said bottom surface of said trough.

16. The apparatus of claim 15, wherein said disengaging means includes a chain positioned adjacent said trough and carrying said block advance pin.

17. The apparatus of claim 11, wherein said pivot pin extends laterally across the width of said trough via cut-away sections formed in said trough and moves downstream through said trough adjacent and substantially parallel to said bottom surface of said trough.

18. The apparatus of claim 17, wherein said engaging means includes a chain positioned adjacent said trough and carrying said pivot pin.

19. The apparatus of claim 11, wherein said engaging means includes a conveyor belt disposed beneath said pivot pin, said conveyor belt maintaining the lower portion of the leading second side of the block against said pivot pin.

20. The apparatus of claim 11, wherein said flip pin extends laterally across the width of said trough via an angled slot formed in said trough and moves downstream through said trough beginning at said bottom surface of said trough and moving at an angle extending away from said bottom surface of said trough.

21. The apparatus of claim 20, wherein said pivoting means includes a chain positioned adjacent said trough and carrying said flip pin.

22. An apparatus for turning a rectangular block having a pair of first sides and a pair of second sides substantially orthogonal to the pair of first sides, comprising:

an elongated trough extending between an upstream end and a downstream end, said elongated trough having a bottom surface supporting one of the first sides of the block prior to turning the block and supporting one of the second sides of the block after turning the block;

means for pushing the block downstream through said trough prior to and after turning the block, said pushing means including a plurality of spaced conveyor pins extending laterally across the width of said trough via a conveyor pin slot formed in said trough and moving downstream through said trough substantially parallel to said bottom surface of said trough;

means for disengaging the block from said conveyor pin and advancing the block downstream away from said conveyor pin prior to turning the block, said disengaging means including a plurality of spaced block advance pins extending laterally across the width of said trough via a block advance pin slot formed in said trough and moving downstream through said trough substantially parallel to said bottom surface of said trough;

means for engaging a lower portion of the leading second side of the block and maintaining the lower portion against said pivot pin following disengagement of the block from said conveyor pin, said engaging means including a plurality of spaced pivot pins extending laterally across the width of said trough via cut-away sections formed in said trough and moving downstream through said trough adjacent and substantially parallel to said bottom surface of said trough, said engaging means further including a conveyor belt disposed beneath said plurality of pivot pins, said conveyor belt maintaining the lower portion of the leading second side of the block against said pivot pin; and means for pivoting the block approximately ninety degrees forward about said pivot pin while the lower portion of the leading second side of the block is maintained against said pivot pin, said pivoting means including a plurality of spaced flip pins extending laterally across the width of said trough via an angled slot formed in said trough and moving downstream through said trough beginning at said bottom surface of said trough and moving at an angle extending away from said bottom surface of said trough.

23. The apparatus of claim 22, wherein said plurality of conveyor pins, said plurality of block advance pins, said plurality of pivot pins, and said plurality of flip pins are carried by respective chains positioned adjacent said trough.

* * * * *